United States Patent
Sun et al.

(10) Patent No.: US 9,923,692 B2
(45) Date of Patent: Mar. 20, 2018

(54) METHOD AND DEVICES FOR CONFIGURING CSI RESOURCES

(71) Applicant: TELEFONAKTIEBOLAGET LM ERICSSON (PUBL), Stockholm (SE)

(72) Inventors: Ying Sun, Sundbyberg (SE); Jing Rao, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 19 days.

(21) Appl. No.: 15/102,717

(22) PCT Filed: Dec. 23, 2013

(86) PCT No.: PCT/SE2013/051617
§ 371 (c)(1),
(2) Date: Jun. 8, 2016

(87) PCT Pub. No.: WO2015/099583
PCT Pub. Date: Jul. 2, 2015

(65) Prior Publication Data
US 2016/0308652 A1    Oct. 20, 2016

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0626* (2013.01); *H04L 5/0051* (2013.01);
(Continued)

(58) Field of Classification Search
CPC . H04L 5/0053; H04L 25/0202; H04L 5/0051; H04L 1/0026; H04L 1/0027;
(Continued)

(56) References Cited

U.S. PATENT DOCUMENTS 8,665,692 B2 * 3/2014 Koivisto ............... H04B 7/024
  370/204
9,350,476 B2 * 5/2016 Lee ....................... H04J 11/005
(Continued)

FOREIGN PATENT DOCUMENTS

EP    2662987 A2    11/2013

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0, Jun. 2013.
(Continued)

*Primary Examiner* — Brian O'Connor
(74) *Attorney, Agent, or Firm* — Patent Portfolio Builders PLLC

(57) ABSTRACT

The disclosure relates to a method performed in a network node of a communication system for configuring a communication device with channel state information, CSI, resources. The method comprises: configuring CSI resources for at least two sectors, the CSI resources comprising CSI reference signal, RS, resources and CSI interference measurements, IM, resources, such that the sectors are configured with same CSI IM resources, and such that each of the sectors is configured with CSI RS resources differing from the other sectors; and configuring the communication device to use a respective CSI resource configuration for each of at least two CSI processes, wherein each CSI resource configuration defines resources corresponding to resources of the configuring of a respective sector, whereby each CSI process specifies use of same CSI IM resources as the other CSI processes and CSI RS resources different from the other CSI processes.

21 Claims, 6 Drawing Sheets

(51) Int. Cl.
- *H04L 25/02* (2006.01)
- *H04L 1/00* (2006.01)
- *H04W 72/04* (2009.01)
- *H04W 84/04* (2009.01)

(52) U.S. Cl.
CPC ........ *H04L 25/0202* (2013.01); *H04L 1/0026* (2013.01); *H04L 1/0027* (2013.01); *H04L 5/0007* (2013.01); *H04W 72/048* (2013.01); *H04W 84/04* (2013.01)

(58) Field of Classification Search
CPC .. H04L 5/0007; H04B 7/0626; H04W 72/048; H04W 84/04
See application file for complete search history.

(56) References Cited

U.S. PATENT DOCUMENTS

| | | | | |
|---|---|---|---|---|
| 9,369,253 | B2* | 6/2016 | Pourahmadi | H04L 5/0053 |
| 9,425,946 | B2* | 8/2016 | Pourahmadi | H04L 5/0007 |
| 9,456,372 | B2* | 9/2016 | Lee | H04L 25/0226 |
| 9,673,945 | B2* | 6/2017 | Geirhofer | H04L 5/0048 |
| 2013/0258965 | A1 | 10/2013 | Geirhofer et al. | |

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013.

3GPP, "3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.3.0, Mar. 2013.

Huawei, "Interference measurement resource configuration and CQI calculation," 3GPP TSG RAN WG1 Meeting #69, R1-121947, May 21-25, 212, Prague, Czech Republic.

Fujitsu, "Email discussion [69-10]: Details of collision handling and compression/multiplexing in case of 2 or more CSIs being configured in the same reporting instance for CoMP CSI feedback," 3GPP TSG RAN WG1 Meeting #70, R1-123295draft, Aug. 13-17, 2012, Qingdao, China.

Renesas Mobile Europe Ltd., "CQI definition," 3GPP TSG-RAN WG1 Meeting #70, R1-123580, Aug. 13-17, 2012, Qingdao, China.

International Search Report and Written Opinion dated Aug. 4, 2014 in related International Application No. PCT/SE2013/051617.

* cited by examiner

| CSI Configuration | Sector 0 | Sector 1 | Sector 2 | Sector 3 |
|---|---|---|---|---|
| 0 | RS | - | - | - |
| 5 | - | RS | - | - |
| 10 | - | - | RS | - |
| 11 | - | - | - | RS |
| 3 | IM | IM | IM | IM |
| 4 | IM | IM | IM | IM |

| CSI Configuration | Sector 0 | Sector 1 | Sector 2 | Sector 3 |
|---|---|---|---|---|
| 0 | RS | - | - | - |
| 5 | - | RS | - | - |
| 10 | - | - | RS | - |
| 11 | - | - | - | RS |
| 3 | IM | IM | IM | IM |
| 4 | IM | IM | IM | IM |

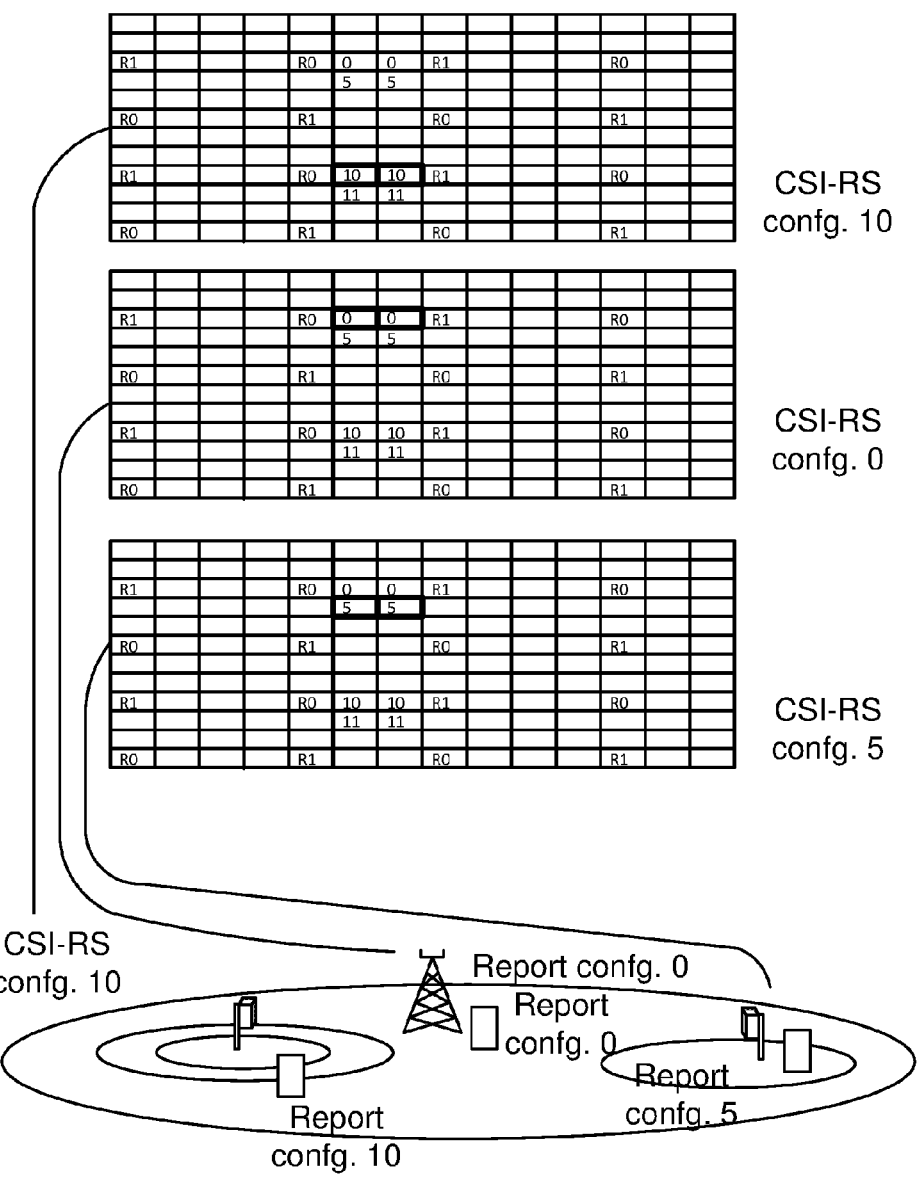

METHOD AND DEVICES FOR CONFIGURING CSI RESOURCES

TECHNICAL FIELD

The technology disclosed herein relates generally to the field of wireless communication, and in particular to configuration of resources within wireless communication systems.

BACKGROUND

In the first release of Long Term Evolution (LTE) standard, a cell-specific reference signal (CRS) was introduced. It is the most basic downlink reference signal transmitted in every downlink sub-frame and in every resource block in the frequency domain. The cell-specific reference signal can thus cover the entire bandwidth of the cell. The cell-specific reference signal is used by communication devices for performing channel estimation in order to obtain coherent demodulation of downlink physical channels and for performing cell selection and making handover decisions. For communication devices adopting release 8 and 9 of LTE, the cell-specific reference signal is also used to acquire channel-state information (CSI).

In LTE Release 10, support for channel-state information reference signals (CSI-RS) is introduced. A reason for introducing CSI-RS is to improve channel estimation for coherent demodulation even under the most extreme channel conditions including very fast channel variations in both time and frequency domain without introducing much overhead. Furthermore, it is believed that introducing a new type of reference signal only targeting CSI entails a flexible and in general lower time/frequency density and corresponding lower overhead per reference signal. CSI-RSs are intended for communication devices to acquire channel-state information.

A transmission hypothesis in multiple-input, multiple-output (MIMO) or Coordinated Multipoint (CoMP) comprises a signal hypothesis and an interference hypothesis. The signal hypothesis specifies transmission points from which data is assumed to have been transmitted, and the interference hypothesis estimates interference suffered during the assumed data transmission. The most desirable would be for the communication device to report CSI of all possible transmission hypotheses, but the feedback overhead and complexity of communication device implementation is proportional to the number of hypotheses and makes this hard to achieve. CSI corresponding to one transmission hypothesis is defined as a CSI process. The CSI process is determined by the association of a signal hypothesis and an interference hypothesis, where the signal hypothesis and interference hypothesis are measured through CSI-RS and CSI interference measurement (IM) resource, respectively.

The configuration of CSI resources is done in a radio resource control (RRC) configuration. For example, for Transmission Mode 9 (TM9), two parameters need to be addressed in the RRC configuration to configure CSI: CSI-RS and zeroTxPower CSI-RS [refer to 3GPP TS 36.331 V11.3.0]. It is possible to configure one CSI-RS per cell/sector. Basically, in order to measure the channel quality of CSI-RS of one cell/sector accurately, the neighboring cells/sectors' CSI-RSs have to be muted, i.e. configured with zero transmit power (ZP, or zeroTxPower) CSI-RS. For TM10, CSI-IM is introduced to measure the interference from the neighboring cell/sectors. The resource used for CSI-IM also needs to be configured. When the resource is configured for interference measurement, the CSI-RS in that resource element has to be muted.

Furthermore, while only one CSI report is supported in TM9, it is possible to have up to 4 CSI processes for TM10 and each CSI process keeps track of channel quality measurement and generates one CSI report.

Difficulties arise in case the network deployment is complex, involving a lot of interference hypotheses, while the CSI resources are limited. A main challenge will be how to configure CSI-RS and CSI-IM resources in an efficient and simple way.

One example of the prior art solution of CSI-RS/CSI-IM configuration is shown in FIGS. 1a, 1b, 1c. In this example, a deployment with three sectors is used. Sector 1, sector 2 and sector 3 are configured with CSI-RS resource configuration 15, 16 and 17 respectively. There are, in this example, three CSI processes per communication device (as illustrated in FIG. 1a) and all CSI processes of a communication device are configured with the same CSI-RS that is associated with the serving sector (i.e. the CSI-RS of the serving sector is used also for the other sectors). For example, sector 1 is configured with CSI-RS configuration 15, and a communication device having sector 1 as serving sector is configured with this CSI-RS configuration for all its three CSI processes (CSI processes 1, 2 and 3). The communication device thus sends, to a network node, a respective CSI-report (see FIG. 1a) corresponding to a respective CSI process.

Thus, in the scenario of FIGS. 1a, 1b, 1c, each sector is sending on one CSI-RS resource and is quiet in nine. For example, Sector 3 transmits on CSI resource element 17 (indicated by non-zero power, NZP, see FIG. 1b) and is quiet in CSI resource elements 5, 6, 9, 10, 13, 14, 15, 16, 18 (indicated by zero-power, ZP, see e.g. FIG. 1a). Different CSI-IM configurations are configured for different CSI processes to measure the different interference hypotheses; in the scenario of FIGS. 1a, 1b, 1c, three CSI-IM hypotheses are tested in each sector. For example (see e.g. FIG. 1b), in Sector 1, interference hypotheses CSI-IM1, CSI-IM2 and CSI-IM3 are tested. When the configuration is used for CSI-IM, the CSI-RS and data transmission is muted in the serving sector (see e.g. FIG. 1c). However, the transmissions in the neighboring sectors are not affected, i.e. they can be muted or they can transmit any information, such as CSI-RS or data.

A first drawback of this solution is the high overhead waste. Overall, there are in total 9 over 144 resource elements to be muted for each sector. The overhead caused by the zero power CSI resource elements is thus about 6.25%.

A second drawback is that all configurations and interference hypotheses are not supported. As seen in FIG. 1c, only 6 hypotheses assuming that the transmissions come from a single transmission point with 6 interference scenarios are supported. Other configurations such as for example joint transmission, where the signal can be transmitted from multiple sectors, are not supported.

Furthermore, the known solution is complicated in the sense that it is not scalable, meaning that whenever there is new sector or the situation changed, the configurations for all sectors need to be changed.

SUMMARY

An object of the present disclosure is to solve or at least alleviate at least one of the above mentioned problems.

The object is according to a first aspect achieved by a method performed in a network node of a communication system for configuring a communication device with channel state information, CSI, resources. The method comprises:

configuring CSI resources for at least two sectors, the CSI resources comprising CSI reference signal, RS, resources and CSI interference measurements, IM, resources, such that the sectors are configured with same CSI IM resources, and such that each of the sectors is configured with CSI RS resources differing from the other sectors, and configuring the communication device to use a respective CSI resource configuration for each of at least two CSI processes, wherein each CSI resource configuration defines resources corresponding to resources of the configuring of a respective sector, whereby each CSI process specifies use of same CSI IM resources as the other CSI processes and CSI RS resources different from the other CSI processes.

The CSI configuration method is very efficient, and the overhead may be largely reduced. With a limited number of supported CSI processes, the method still enables the covering of all coordination hypotheses. Furthermore, the configuration is easily scaled when the number of sectors for a communication device is changed.

The object is according to a second aspect achieved by a network node of a communication system for configuring a communication device with channel state information, CSI, resources. The network node comprises a processor and memory, the memory containing instructions executable by the processor, whereby the network node is operative to:

configure CSI resources for at least two sectors, the CSI resources comprising CSI reference signal, RS, resources and CSI interference measurements, IM, resources, such that the sectors are configured with same CSI IM resources, and such that each of the sectors is configured with CSI RS resources differing from the other sectors, and configure the communication device to use a respective CSI resource configuration for each of at least two CSI processes, wherein each CSI resource configuration defines resources corresponding to resources of the configuring of a respective sector, whereby each CSI process specifies use of same CSI IM resources as the other CSI processes and CSI RS resources different from the other CSI processes.

The object is according to a third aspect achieved by a computer program for a network node of a communication system for configuring a communication device with channel state information, CSI, resources. The computer program comprises computer program code, which, when run on the network node causes the network node to:

configure CSI resources for at least two sectors, the CSI resources comprising CSI reference signal, RS, resources and CSI interference measurements, IM, resources, such that the sectors are configured with same CSI IM resources, and such that each of the sectors is configured with CSI RS resources differing from the other sectors, and configure the communication device to use a respective CSI resource configuration for each of at least two CSI processes, wherein each CSI resource configuration defines resources corresponding to resources of the configuring of a respective sector, whereby each CSI process specifies use of same CSI IM resources as the other CSI processes and CSI RS resources different from the other CSI processes.

The object is according to a fourth aspect achieved by a computer program product comprising a computer program as above, and a computer readable means on which the computer program is stored.

Further features and advantages of the present disclosure will become clear upon reading the following description and the accompanying drawings.

BRIEF DESCRIPTION OF THE DRAWINGS

FIG. 5 illustrates a CSI process configuration.

FIG. 6 illustrates a CSI configuration for a communication device within a three sector combined cell.

DETAILED DESCRIPTION

Figure 1:
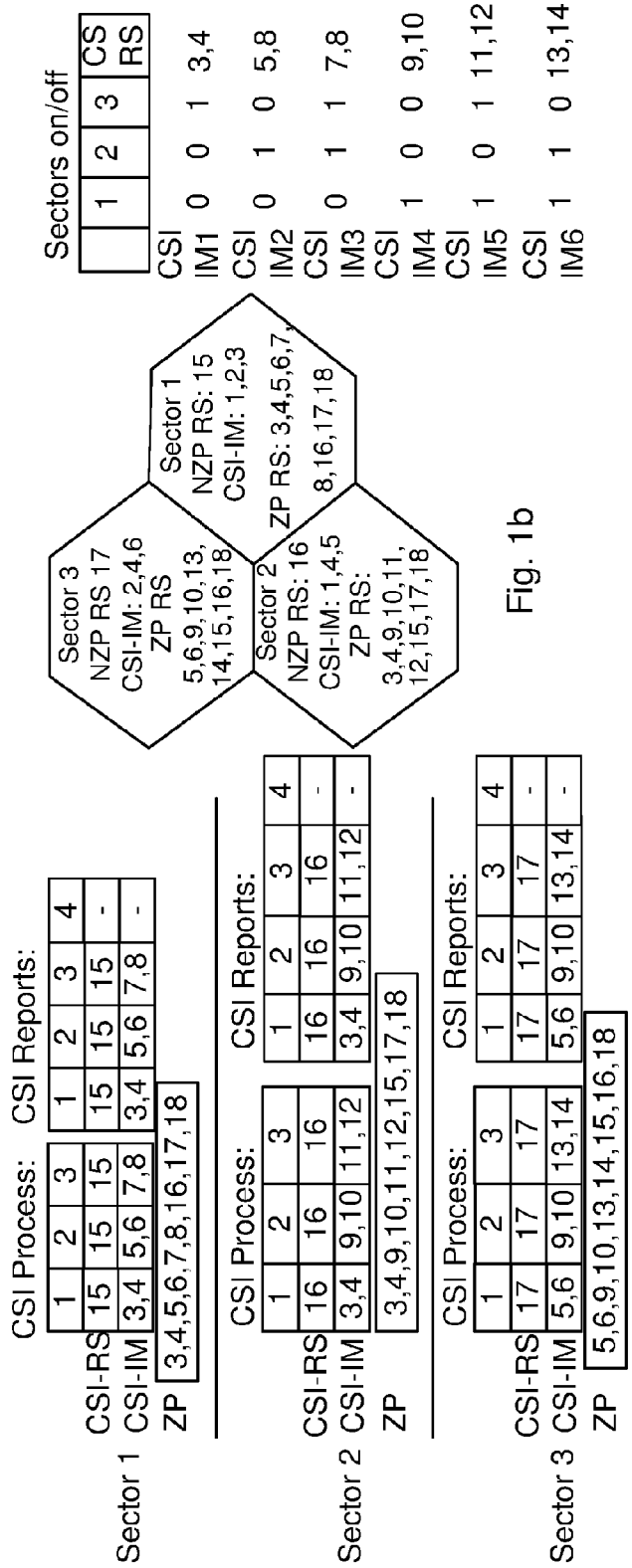
FIGS. 1a, 1b, 1c illustrate an example of CSI-RS configuration in an intra-site 3 sector case.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

First, some more background is given relating to LTE specifics:

In downlink, LTE may use multiple-input multiple-output (MIMO) technology to enable high data rates, and LTE also supports beamforming. The various modes for downlink (from network node to communication device) are defined in such transmission modes (TMs), e.g. TM1 defining single transmit antenna, TM5 defining multi-user MIMO etc. CSI-RS is intended for LTE Release 10 and Release 10+ enabled communication devices to acquire channel-state information. Specifically, in Release 10, CSI-RSs are used for transmission mode 9 (TM9) and in Release 11 it is used for transmission mode 10 (TM10).

For TM9 and TM10 enabled communication devices, the signal is measured on CSI-RS. In TM10 interference is taken on the CSI-IM resource to be the sum of noise and other cells data interference. In TM9 interference is taken on the CRS resource to be the sum of noise and other cells CRS interference or data interference.

As mentioned earlier, the configuration of CSI resources is done in a radio resource control (RRC) configuration. For example, for normal cyclic prefix the mapping of CSI resource configuration to the resource elements is defined in Table 6.10.5.2-1 in 3GPP TS 36.211 V11.3.0. As another example, for extended cyclic prefix the mapping of CSI resource configuration to the resource elements is defined in Table 6.10.5.2.2 in 3GPP TS 36.211 V11.3.0.

As also mentioned earlier, the configuration of CSI-RS and CSI-IM resources for one or multiple CSI processes per communication device is a great challenge, in that resources should not be wasted and in that the communication device implementation should not be too complicated, while still as many interference hypotheses as possible should be provided.

Briefly, the present disclosure provides, in various embodiments, a method for configuring CSI resources (CSI-RS and CSI-IM) more efficiently. Different none-zero power CSI-RS may be configured for different CSI processes, while keeping the same CSI-IM configurations for all processes of all communication devices in a communication system. The transmissions of all sectors at the CSI-IM configurations may be muted so that only noise is measured for different communication devices. As will be shown, the channel measurement of all interference hypotheses relating to a communication device can be derived in a network node, e.g. evolved NodeB (eNB), based on the CSI reports from all CSI processes.

It is noted that this is in contrast to prior art, wherein a communication device that is configured with multiple CSI processes, each such CSI process corresponding to a set of CSI-RS, would be configured such that the set of CSI-RS is the same for all CSI-processes while the CSI-IM resource of the different CSI processes are different.

In various embodiments, a common filtering can be applied for the noise measurements of all the CSI processes. The filtered noise level value is reported in all the CSI reports.

The eNB may configure the CSI resources in accordance with one or more of the following steps: First (referred to as step 1 below), the eNB configures CSI resources on sector level. Second (referred to as step 2 below), the eNB decides communication device specific CSI configurations for every CSI process depending on capability of the communication device and depending on the serving sector of the communication device. Third (referred to as step 3 below), the eNB sends RRC messages containing the CSI configurations to the communication devices. Fourth (referred to as step 4 below), the communication device will configure the CSI resource according to the CSI configurations carried in the RRC messages. Fifth (referred to as step 5 below), the communication device reports CSI to eNB. Sixth (referred to as step 6 below), eNB may derive channel quality estimates of different coordination hypotheses based on the reports. Seventh (referred to as step 7 below), some of the steps may be repeated, e.g. when transmission points (also denoted sectors) for a communication device are changed. It is noted that the order of the steps may be changed, and that some steps could be performed essentially simultaneously.

Furthermore, the selection and/or reselection of the CSI configuration of a communication device may be performed by monitoring the path gain change of the serving and neighboring cell or uplink signal quality changes. The uplink signal for measuring per sector channel quality may for example be Sounding Reference Signal (SRS) or physical uplink shared channel (PUSCH), physical random access channel (PRACH) or physical uplink control channel (PUCCH). The CSI-RS configurations of the sectors that have the best uplink channel quality may typically be selected for the communication device.

The above steps are described more in detail in the following.

Figures 2, 3, 4:
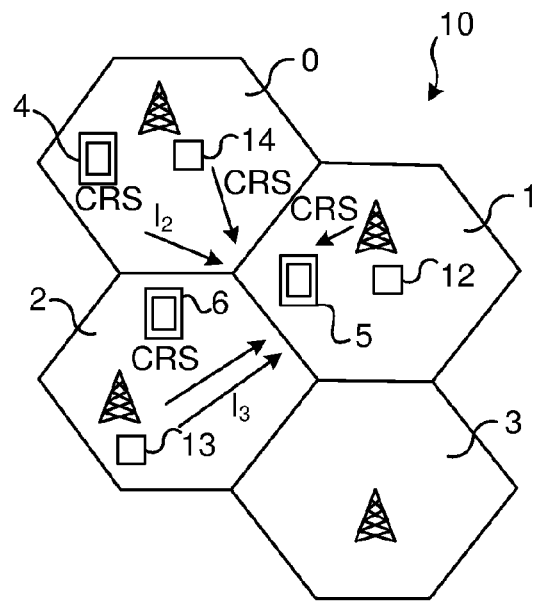
FIG. 2 illustrates schematically an environment in which embodiments of the present disclosure may be implemented.
FIG. 3 illustrates a sector/cell level CSI resource configuration.
FIG. 4 illustrates an example on communication device level CSI RS resource selection based on the sector/cell level CSI configuration.

Step 1, CSI Configuration on Sector Level:

At the sector (cell) setup, the CSI resources are configured per sector (cell), i.e. on sector/cell level. FIGS. 2 and 3 illustrate an example of a communication system 10 scenario comprising 4 sectors: sector 0, sector 1, sector 2 and sector 3. The communication system 10 may comprise several network nodes 12, 13, 14, in the following exemplified by evolved NodeB (eNB), each network nodes 12, 13, 14 having one or more coverage areas. That is, one network node, which may for example comprise an eNB, may serve one or more radio coverage areas 0, 1, 2, 3, also denoted cells or sectors. The eNB 12, 13, 14 provides radio communication for communication devices 4, 5, 6 within its coverage area. The communication device 4, 5, 6 may comprise any type of wireless device, e.g. smart phone, laptop computer, cell phone, tablet computer etc.

There are in total 6 CSI configurations used in the exemplary scenario of the communication system 10. The CSI configurations are denoted 0, 5, 10, 11, 3, and 4 in FIG. 3. Four of them, 0, 5, 10 and 11, are used for "RS" of sector 0, 1, 2, 3. In the FIG. 3, "-" indicates that the sector is muted in the corresponding CSI configuration (which is thus a zero power configuration of that resource element in that sector). For example, in CSI configuration 0, sector 0 transmits CSI-RS, while sectors 1, 2, and 3 are muted, and in CSI configuration 10, sector 2 transmits CSI-RS, while sectors 0, 1, and 3 are muted. As an example, a corresponding interference hypothesis for CSI configuration 10 would be that the interference is only from sector 2, while there is no interference from sectors 0, 1, 3, i.e. an assumed transmission experiences interference from sector 2 only. CSI configurations 3 and 4 are used for all sectors to measure the interference (denoted IM, interference measurement, in the FIG. 3). When they are configured, all sectors in the communication system 10 are muted for all transmissions, and only noise is measured, the noise comprising also interference from far-off sectors. The communication device 4, 5, 6 thus measures interference on the resource elements configured for CSI-IM to get interference estimation.

Step 2, CSI Configuration on Communication Device Level:

The eNB 12, 13, 14 selects an initial set of sectors in which to send CSI-RSs, i.e. a set of sectors that is relevant for the communication device. If the communication device supports only one CSI process, then a configuration with CSI-RS for the serving sector (i.e. CSI-RS sent in the serving sector, compare e.g. configuration 0 of FIG. 3) or best sector would be relevant and may be used, and CSI-IM for the most probable interference measurement. If the communication device supports multiple processes, then a primary process may be used comprising also a configuration with CSI-RS for the serving cell or with CSI-RS for the best cell, and CSI-IM for the most probable measurement. Two scenarios need to be considered for this selection: separate cell and combined cell.

For the combined cell scenario, in which multiple sectors are combined into a single cell and all sectors use the same Physical Cell Identity (PCI), the CSI sector selection can be based on received power of uplink transmissions. The uplink transmissions can be PRACH preamble, or message 3 transmission on PUSCH, PUCCH or SRS transmission. The criteria based on which to select sectors may be chosen in various ways; one example is to select the sectors that have uplink signal quality above a predefined threshold. Since there is a limited number N of CSI processes (e.g. N=4 for release TM10 communication devices) the number of sectors selected is at most equal to N. If there are more than N sectors with a signal quality higher than the threshold, still only the N sectors that have the strongest signal quality are selected. One example of the signal quality metric can be the received SRS signal strength.

For the separate cell case, the communication device may select serving cell based on the CRS Reference Signal Received Power (RSRP) or the estimated path gain. It is also possible for the eNB to send RRC message to acquire measurement reports (MR) that contain the CRS RSRP measurements of the serving cell and the neighboring cells. The selection of the cell in which to send CSI-RS can follow the criteria that the serving cell is always selected and the other selected CSI-RS configuration will be the CSI configuration corresponding to the N−1 cells that have the strongest CRS RSRP or path gain. The path gain $G_i$ of the cell i to the communication device can be estimated based on below equation:

$$G_i = \frac{RSRP_i}{P_i}$$

where $P_i$ is the transmit power of cell i. In order to obtain path gain $G_i$ to different cells, it is again possible to use uplink signal such as PRACH, PUSCH, PUCCH or SRS if the measurements of the neighboring cells are available in the serving cell. They are typically available if the neighboring cells and the serving cell belong to the same site, i.e. sectors controlled by the same eNB. Alternatively, the uplink channel quality measurements per sector may be exchanged over X2 interface between the network nodes, in particular between eNBs.

In accordance with an aspect of the present disclosure, the CSI configuration of CSI-IM resources is always selected to be the same for all the CSI processes of the communication device 4, 5, 6 in the communication system 10.

FIG. 4 shows an example on how the communication device level CSI-RS resource is selected accordingly based on the cell level CSI configuration (refer to FIG. 3). In this example, the hypothesis is that there are only three sectors that possibly interfere with each other (e.g. have path gain higher than a certain threshold) or can be interfered by the communication device 4. Those sectors are sector 0, 1 and 2. The CSI-RS resource configuration for the communication device is then 0, 5, 10 (marked in the FIG. 4 by box 20). The CSI-IM resource configuration is configuration 3, 4 for all the CSI-processes of the communication device (marked in the FIG. 4 by box 21). The zero power CSI-RS (indicated by "-") configured for sector 0 is 5, 10, 3, 4; the zero power CSI-RS configured for sector 1 is 0, 10, 3, 4; and for sector 2, the zero power CSI-RS will be 0, 5, 3, 4.

Step 3, RRC Signaling:

The eNB sends an RRC configuration message to the communication device, the RRC configuration message containing the CSI configuration information. If the communication device is a release ii communication device supporting TM10, it can be configured with at most four CSI processes.

The CSI processes for the communication device in the above example are illustrated in FIG. 5, and in particular a communication device using TM10. A first CSI process, CSI process 0, is thus using CSI-RS configuration 0, in which CSI-RS is sent in sector 0 while sector 1 and sector 2 are muted, and CSI-IM configuration 3, 4 are used. A second CSI process, CSI process 1, is using CSI-RS configuration 5, i.e. sending CSI-RS in sector 1 and muting sector 0 and 2, again using CSI-IM configuration 3, 4. A third CSI process, CSI process 2, is using CSI-RS configuration 10, i.e. sending CSI-RS in sector 2 while muting sector 0 and sector 1, again using CSI-IM configuration 3, 4. At the CSI-IM configuration 3, 4 all the transmission from sectors 0, 1, 3 are muted. In this example, CSI process 3 is the primary CSI process. The CSI-RS is configured to the serving sector CSI-RS (for example sector 0) and CSI-IM is configured at CSI configuration 7, 8. This is used for measuring the most probable interference hypothesis (for example interference from sector 1 and 2).

The above CSI configuration is visualized also in the FIG. 6, wherein the communication device is located within a combined cell comprising three sectors. Rank inheritance may be configured so that the reported rank of the primary process is the reference rank and this reference rank should be used for all the CSI measurements of all the other CSI-processes as well.

Step 4, Communication Device Configuration:

The communication device receives the configuration, i.e. the RRC configuration message, and configures the CSI processes accordingly.

Step 5, Communication Device Reporting CSI Using CSI-RS, CSI-IM:

The communication device measures the channel quality for each CSI process (CSI process 0, 1, 2, 3, of FIG. 5) and transmits CSI report(s) to the eNB. The CSI reports for sector 0, 1, 2 and 3 are received and mapped to a respective channel quality (CQ) value, with the assumption that the interference is only noise (not data transmissions). The channel quality values are denoted $CQ_0$ (channel quality value for sector 0), $CQ_1$ (channel quality value for sector 1) and $CQ_2$ (channel quality value for sector 2) in the following. $CQ_3$ is the channel quality value for the most probable transmission hypothesis. In the CSI report 3 (corresponding to CSI process 3), the communication device reports the channel quality according to the CSI-RS signal from the serving sector (sector 0) and the interference measurements from sector 1 and sector 2.

Figure 7:
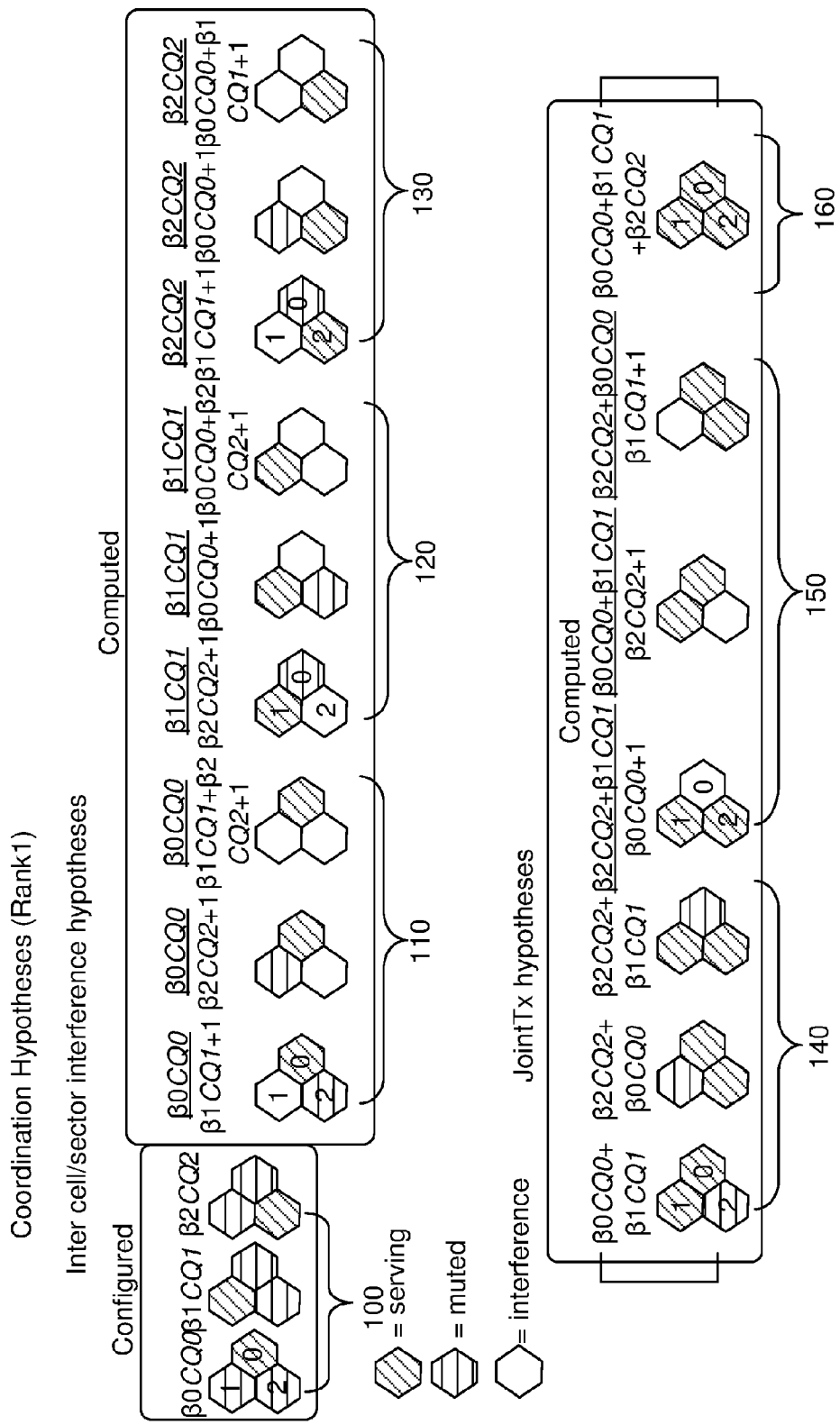
FIG. 7 illustrates configuration and interference hypotheses derived from different channel quality metric CQI in different sectors.

Step 6, Deriving Channel Quality Estimations:

The eNB receives the CSI reports relating to the CSI processes of the communication device and is able to derive channel quality estimation for different coordination hypotheses based on the combination of CQ from different sectors. In FIG. 7, coordination hypotheses are illustrated and the communication device is assumed to use rank 1 (i.e. a single transmission layer in MIMO). Reference numeral 100 indicates the configured CSI configuration for the communication device: while a serving sector (sector 0) is transmitting, the other two sectors (sectors 1 and 2) are muted.

The eNB may first derive the channel quality for the data channel based on the channel quality measurement on CSI-RS.

Since all sectors are muted at the CSI-IM configuration, only noise including interference from far-off sectors (i.e. from sectors that are not part of the coordinated cluster) is measured for the communication device in all its CSI-IM reports. The received CSI-RS channel quality $CQ_i$ of sector i can be denoted:

$$CQ_i = \frac{S_i}{n}$$

where $S_i$ is the received CSI-RS signal power of sector i and n is the noise of the receiver of the communication device. The transmit power $P_i^d$ of data channel of sector i can be written as:

$$P_i^d = \beta_i P_i^{CSI-RS}$$

where $P_i^{CSI-RS}$ is the transmit power of CSI-RS in sector i and $\beta_i$ is the ratio between the transmit power of data channel and the transmit power of CSI-RS in sector i. The channel quality in data channel can now be derived as:

$$CQ_i^d = \beta_i CQ_i$$

FIG. 7 illustrates various inter-sector interference hypotheses. In the figure, sector-clusters are illustrated, each cluster comprising three sectors. A communication device is configured with three different CSI-processes, as indicated at reference numeral 100. In a first CSI configuration, CSI-RS is sent in cell 0 providing $CQ_0^d = \beta_0 CQ_0$. In a second CSI configuration, CSI-RS is sent in cell 1 providing $CQ_1^d = \beta_1 CQ_1$. In a third CSI configuration, CSI-RS is sent in cell 2 providing $CQ_2^d = \beta_2 CQ_2$. The computed inter-cell/inter-sector interference hypotheses are described next. In particular, at 110, three hypotheses are illustrated, each hypothesis assuming that sector 0 is transmitting (sector 0 being serving sector). At 120, also three hypotheses are illustrated, each hypothesis assuming that sector 1 is transmitting (sector 1 being serving sector). At 130, again three hypotheses are illustrated, each hypothesis assuming that sector 2 is transmitting (sector 2 being serving sector). In the hypotheses, at 110, when sector 0 transmits, sector 2 may be assumed muted and interference determined/derived for sector 1 (leftmost sector-cluster at reference numeral 110); or sector 1 may be assumed muted and interference be determined for sector 2 (middle sector-cluster at reference numeral 110); or interference may be determined for both sectors 1 and 2 (right-most sector-cluster at reference numeral 110). The computations for each of these interference hypotheses are given below:

Leftmost sector-cluster at reference numeral no:

$$\frac{\beta 0 CQ0}{\beta 1 CQ1 + 1}$$

Middle sector-cluster at reference numeral no:

$$\frac{\beta 0 CQ0}{\beta 2 CQ2 + 1}$$

Rightmost sector-cluster at reference numeral 110:

$$\frac{\beta 0 CQ0}{\beta 1 CQ1 + \beta 2 CQ2 + 1}$$

The corresponding determinations may be performed for other hypotheses. Thus:

At 120, also three hypotheses are illustrated, each hypothesis assuming that sector 1 is transmitting (sector 1 serving). In the hypotheses, at 120, when sector 1 transmits, sector 0 may be assumed muted and interference determined/derived for sector 2 (leftmost sector-cluster at reference numeral 120); or sector 2 may be assumed muted and interference be determined for sector 0 (middle sector-cluster at reference numeral 120); or interference determined for both sectors 0 and 2 (right-most sector-cluster at reference numeral 120). The computations for each of these interference hypotheses are given below:

Leftmost sector-cluster at reference numeral 120:

$$\frac{\beta 1 CQ1}{\beta 2 CQ2 + 1}$$

Middle sector-cluster at reference numeral 120:

$$\frac{\beta 1 CQ1}{\beta 0 CQ0 + 1}$$

Rightmost sector-cluster at reference numeral 120:

$$\frac{\beta 1 CQ1}{\beta 2 CQ2 + \beta 0 CQ0 + 1}$$

At 130, also three hypotheses are illustrated, each hypothesis assuming that sector 2 is transmitting (sector 2 is serving sector). In the hypotheses, at 130, when sector 2 transmits, sector 0 may be assumed muted and interference determined/derived for sector 1 (leftmost sector-cluster at reference numeral 130); or sector 1 may be assumed muted and interference be determined for sector 0 (middle sector-cluster at reference numeral 130); or interference may be determined for both sectors 1 and 0 (right-most sector-cluster at reference numeral 130). The computations for each of these interference hypotheses are given below:

Leftmost sector-cluster at reference numeral 130:

$$\frac{\beta 2 CQ2}{\beta 1 CQ1 + 1}$$

Middle sector-cluster at reference numeral 130:

$$\frac{\beta 2 CQ2}{\beta 0 CQ0 + 1}$$

Rightmost sector-cluster at reference numeral 130:

$$\frac{\beta 2 CQ2}{\beta 1 CQ1 + \beta 0 CQ0 + 1}$$

Thus, the eNB may compute the necessary or desired coordination hypotheses based on the different combinations of channel quality $CQ_i$ according to the above equations (equations shown also in FIG. 7).

Further, joint transmission hypotheses may also be determined (in particular computed), as also illustrated in FIG. 7:

At reference numeral 140, also three hypotheses are illustrated, but here each hypothesis assumes that two sectors are transmitting while one is not. That is, joint transmission from two sectors, other sector muted.

For the hypotheses illustrated in the leftmost sector-cluster at reference numeral 140, sectors 0 and 1 are transmitting, while sector 2 may be assumed muted. The computations for this interference hypothesis are then:

$$\beta1CQ1+\beta0CQ0$$

For the hypotheses illustrated in the middle sector-cluster at reference numeral 140, sectors 0 and 2 are transmitting, while sector 1 may be assumed muted. The computations for this interference hypothesis are then:

$$\beta2CQ2+\beta0CQ0$$

For the hypotheses illustrated in the rightmost sector-cluster at reference numeral 140, sectors 1 and 2 are transmitting, while sector 0 may be assumed muted. The computations for this interference hypothesis are then:

$$\beta1CQ1+\beta2CQ2$$

At reference numeral 150, also three hypotheses are illustrated, here again each hypothesis assumes that two sectors are transmitting. That is, joint transmission from two sectors, interference determined from other sector.

For the hypotheses illustrated in the leftmost sector-cluster at reference numeral 150, sectors 1 and 2 are transmitting, while interference is determined from sector 0. The computations for this interference hypothesis are then:

$$\frac{\beta1CQ1+\beta2CQ2}{\beta0CQ0+1}$$

For the hypotheses illustrated in the middle sector-cluster at reference numeral 150, sectors 1 and 0 are transmitting, while interference is determined from sector 2. The computations for this interference hypothesis are then:

$$\frac{\beta1CQ1+\beta0CQ0}{\beta2CQ2+1}$$

For the hypotheses illustrated in the rightmost sector-cluster at reference numeral 150, sectors 0 and 2 are transmitting, while interference is determined from sector 1. The computations for this interference hypothesis are then:

$$\frac{\beta0CQ0+\beta2CQ2}{\beta1CQ1+1}$$

At reference numeral 160, a final interference hypotheses is illustrated, the hypothesis assuming that all three sectors 1, 2, 0 are transmitting. That is, joint transmission from three sectors. The computations for this interference hypothesis are then:

$$\beta1CQ1+\beta2CQ2+\beta0CQ0$$

As seen in FIG. 7 and as described above, all the possible coordination hypotheses, i.e. muting physical downlink shared channel (PDSCH), different inter sector interference scenarios, and joint transmissions can be obtained by the different combinations of channel quality measurements $CQ_0$, $CQ_1$, $CQ_2$ obtained from the three CSI processes (i.e. the three CSI processes configured for the communication device, as indicated at reference numeral 100). Based on the different hypotheses, a downlink scheduler of the eNB selects the coordination scheme and assigns the resource needed for the transmissions of the next scheduling instance.

The estimated channel quality may be further filtered in order to obtain increased accuracy. In particular:

$$\text{filtered } CQ_i=(1-\alpha_i)\text{filtered } CQ_i+\alpha_iCQ_i$$

where $\alpha_i$ is a forgetting factor. $CQ_i$ is the channel quality value reported by the communication device if hypothesis i corresponding to the CSI report from the primary process which is the measured result. If hypothesis i is not the most probable transmission hypothesis, $CQ_i$ is the estimated result based on a combination of different CSI reports and the corresponding equation is shown in FIG. 7 (at reference numerals 110, 120, 130, 140, 150, 160.

As mentioned, FIG. 7 and related description refer to the case that the communication device is using rank 1. However, the present disclosure is applicable also for higher order ranks. For example, if the communication device transmits using rank 2 the channel quality for different hypotheses for the communication device can be determined by:

$$CQ_i = \frac{\sum_{i \in Ti}\sum_{r=1}^{R} CQ_i^r}{\sum_{j \in Ii}\sum_{r=1}^{R} CQ_j^r + 1},$$

where $CQ_i$ is the channel quality estimate of transmission hypothesis i $CQ_{i,r}$ is the channel quality report for rank r of hypothesis i R is the maximal rank that may be supported in primary process $T_i$ is a set of transmission points used for signal transmission $CQ_{j,r}$ is the channel quality reports from transmission point j that is used for interference transmission for hypothesis I and rank r j are the transmission points which are interferes for hypothesis i Ii is the set of transmission points which are interferers for hypothesis i.

A communication device able to perform 4 CSI processes simultaneously may be configured with three configurations as has been described, i.e. with same CSI-IM configuration for the three CSI processes and different CSI-RS configurations for the three CSI processes. The fourth process may be a primary CSI process, which corresponds to a CSI configuration having same CSI-RS resources as one of the other CSI processes and a different CSI-IM resource than this other CSI process. The fourth process is then a prior art configuration, which may be used for improving accuracy. In particular, the CSI report resulting from the fourth CSI process may be compared with the result from the other CSI reports (corresponding to the other CSI processes) and the result of the comparison may be used for correcting the interference hypotheses, thus improving accuracy.

It is noted that outer loop link adaptation should be able to compensate for CQ errors. Further, Interference Rejection Combining (IRC) gain may be estimated and included. This may be done by comparing the received CSI report of the primary CSI process with the computed CQ value of the corresponding hypothesis. The difference between them is the IRC gain. Further still, IRC gain may be applied only for the first codeword in case of rank two transmission; codewords referring to channel encoded bits originating from same block of information bits. For example, in case of a single layer, the codeword is mapped to the single layer. In case of 2 layers, the codewords are mapped to the two layers. When the communication device is transmitting with two transport blocks (2 layers using MIMO) there will be two channel qualities $CQ_{11}$ and $CQ_{22}$ corresponding to the two transport block qualities reported in the single CSI report. A combined channel quality report from the two transport blocks will be needed to computer CQ, i.e. combination of $CQ_{11}$ and $CQ_{22}$.

It is also noted that the eNB should configure CSI rank inheritance for different CSI processes, so that the same rank is reported for all CSI processes. In particular, since the CSI processes are used for measuring different hypothesis, the CQ measurements from different CSI processes might be based on different ranks. For the case of multiple rank (for example rank 2), one CSI processes might contain two CSI reports which corresponding to one for rank 1 and one for rank 2. Without rank inheritance, the communication device might thus report different ranks for different CSI processes which would render the interpreting of the CQ results difficult. The eNB should therefore configure rank inheritance bit when configuring CSI processes. When this rank inheritance bit is set, the ranks of all CSI processes will be the same as the rank in the reference CSI process. Improved CQ accuracy can thereby be achieved without miss-interpretation of different ranks.

Step 7, Repeating Steps when Transmission Points for Communication Device Change:

If the neighboring sector relation has changed, which can be detected by either monitoring for example SRS measurements or measurement reports update (e.g. handover), the communication device level CSI configuration needs to be updated. That is, step 2 and the following steps need to be repeated and RRC reconfiguration needs to be sent to the communication device.

In the computing of the different hypothesis (illustrated in FIG. 7 and described in related text), it is assumed that the noise measurements of different CSI processes are the same. If the measurements in different CSI processes are performed in the communication device independently of each other, the value of the measured signal strength (i.e. CSI-RS) or interference noise (i.e. CSI-IM) will be slightly different, since the receiver of the communication device has a certain noise level which may vary.

Therefore, to get a more accurate result and render the assumption closer to the truth, the noise level may be filtered over the measurements of all CSI processes and use the averaged result to compute the channel quality report. That is, the noise level of the receiver may be averaged. The same filtered noise level measurement result is used for all the CSI reports associated in different CSI processes. At the CSI-IM, where there is not data or CSI-RS transmission, the noise can be measured by the communication device. The noise comprises thermal noise and uncoordinated interference from other transmission points outside the coordination cluster of sectors. Since the same CSI-IM is configured for all CSI processes of the particular communication device, the measurements may be filtered in the communication device over all the CSI processes, whereby an improved accuracy may be obtained. Same noise and interference measurements for all CSI processes will thus be obtained in the eNB and used for computing CSI reports in all CSI processes of the communication device that are configured with the same IM configuration.

With this improvement, the overhead can be further reduced. In the above example, 50% resource saving can be further achieved by allowing the CSI-IM co-located with CSI-RS resource. Furthermore, by allowing the special handling that noise measurement is filtered over all CSI processes and the same noise value is used for computing the channel quality measurements in all CSI reports, better accuracy can be achieved when the eNB receives the CSI reports and estimates the channel quality for the coordination hypotheses based on the combination of different CSI reports.

The CSI configuration method is very efficient, and the overhead may be reduced about 55.6% (from 6.2% to 2.8%) in the above example. By allowing CSI-IM and CSI-RS co-located at the same resource, the overhead can be further reduced by 50%. With the limited number of supported CSI processes it is possible to cover all coordination hypotheses with the limited number of CSI processes without RRC reconfigurations. Furthermore, it is easily scaled when changing the number of sectors.

Figure 8:
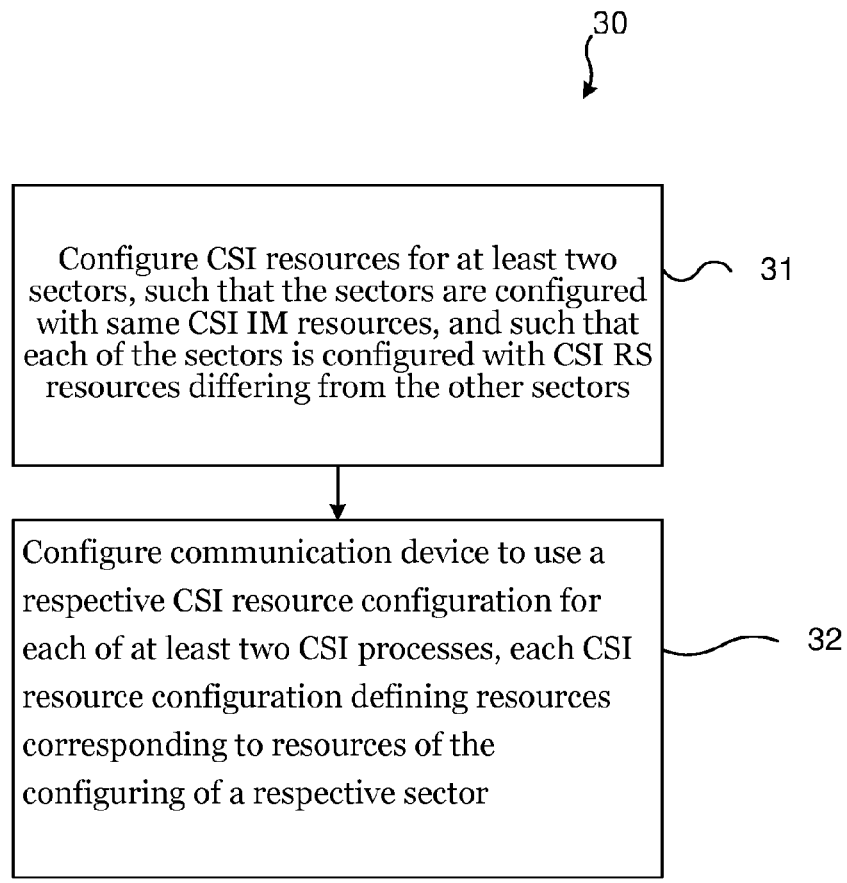
FIG. 8 illustrates a flow chart over steps of a method in a network node in accordance with the present disclosure.

FIG. 8 illustrates a flow chart over steps of a method in a network node in accordance with the present disclosure. The method 30 may thus be performed in a network node 2 of a communication system 1 for configuring a communication device 5 with channel state information, CSI, resources. The method 30 comprises:

configuring 31 CSI resources for at least two sectors 0, 1, 2, 3, the CSI resources comprising CSI reference signal, RS, resources and CSI interference measurements, IM, resources, such that the sectors 0, 1, 2, 3, are configured with same CSI IM resources, and such that each of the sectors 0, 1, 2, 3, is configured with CSI RS resources differing from the other sectors 0, 1, 2, 3, and configuring 32 the communication device 5 to use a respective CSI resource configuration for each of at least two CSI processes, wherein each CSI resource configuration defines resources corresponding to resources of the configuring 31 of a respective sector 0, 1, 2, 3, whereby each CSI process specifies use of same CSI IM resources as the other CSI processes and CSI RS resources different from the other CSI processes.

The method enables measurements of single sector hypotheses, which measurements may then be combined to calculate a number of different multi-sector hypotheses. This is accomplished by configuring the same CSI-IM resources in a cluster of sectors, e.g. a cluster of three or four sectors, and configuring different CSI-RS resources in the different sectors. In each sector of the cluster a unique CSI-RS resource is thus configured, i.e. all sectors a configured with CSI-RS resources different from the CSI-RS resources in all other sectors. A communication device may then measure interference in the CSI-RS resources separately, and when one CSI-RS is sent the other sectors are not sending CSI-RS. CSI-IM resources may be seen as zero-power CSI-RS resources, i.e. when a CSI-IM resource is configured, no CSI-RS is sent (zero power). In accordance with the present disclosure, the CSI-IM resources are the same for all sectors, i.e. muted simultaneously. As the CSI-IM resources are configured to be the same in all sectors of the cluster, while the CSI-RS resources are different for all sectors, a CSI report (corresponding to one CSI process) received from a communication device comprises interference measurements for one CSI-RS at a time.

This is in contrast to the prior art, wherein the same CSI-RS resources are configured in all sectors of a cluster of sectors. In a CSI report the communication device reports interference received when the CSI-RS resource corresponding to the CSI-RS resource from the serving sector is configured. The interference comprises e.g. interference from CSI-RS transmissions in the other sectors and data transmissions in the other sectors.

It is noted that a CSI-RS resource could, at some occasions, be reused. For example, if two sectors in the cluster of sectors are far away from each other and have sufficient degree of isolation between each other, the CSI-RS could be the same for these sectors.

In an embodiment, the method 30 comprises:
establishing that a communication device 5 is configurable for multiple CSI processes, and wherein the configuring 32 comprises:
transmitting a configuration message comprising the CSI resource configurations for each of the at least two CSI processes.

In this embodiment, the network node establishes that the communication device can be configured for several CSI processes simultaneously. A single configuration message, e.g. RRC configuration message, may then be sent to this communication device, the configuration message comprising all configurations (e.g. 4) corresponding to all CSI processes to be performed by the communication device.

In a variation of the above embodiment, the configuration message comprises, for transmission ranks equal to two and higher, a rank inheritance indication configuring the communication device 5 to report same rank for all CSI processes.

In an embodiment, the method 30 comprises:
establishing that a communication device 5 is configurable for a single CSI process, and wherein the configuring 32 comprises:
transmitting a first configuration message comprising a first CSI resource configuration for a first CSI process and transmitting a respective reconfiguration message comprising a respective CSI resource configuration for each of the remaining CSI processes.

In this embodiment, the communication device is established to be able to perform only one CSI process at a time. The different configurations are therefore sent one at a time, i.e. in a time-multiplexed manner. The first configuration, corresponding to a first CSI process, may be sent in a RRC configuration message. A second configuration, corresponding to a second CSI process, may be sent in an RRC reconfiguration message, i.e. the communication device is reconfigured to use this second configuration. If the network node needs further CSI reports, then it sends RRC reconfiguration messages comprising the additional configurations, corresponding to additional CSI processes to be performed by the communication device.

In an embodiment, the method 30 comprises configuring the communication device 5 to use a primary CSI resource configuration comprising same CSI-RS resources as one of the at least two CSI processes and different CSI-IM resources as the at least two CSI processes.

As has been described earlier, such set of CSI configurations enables correction of hypotheses to be made, whereby an increased accuracy is provided.

In an embodiment, the method 30 comprises:
receiving, from the communication device 5, a CSI report for each CSI process, and
deriving, based on the CSI reports, a channel quality estimation for different hypothesis regarding transmission decisions of the at least one sector 0, 1, 2, 3, of the set of sectors, wherein the hypotheses comprises inter-sector interference hypotheses, and/or joint transmission hypotheses.

In an embodiment, the method 30 comprises repeating, upon change of neighboring sectors for the communication device 5, configuring 32 of the communication device 5.

In an embodiment, each CSI process is defined by one CSI-RS configuration and one CSI-IM configuration, and the method 30 comprises configuring the CSI-IM configuration for all communication devices of the communication system 1 which are configurable for more than one CSI process to be, across all the communication devices, the same for at least two CSI processes, or the same for at least all but one of the CSI processes for which each particular communication device is configurable.

All CSI-processes may be configured to use the same CSI-IM for all communication devices of the communication system 1, or one primary process may be configured to use a different CSI-IM and the remaining CSI processes to use the same CSI-IM for all communication devices of the communication system 1. It is noted that in the latter case, there could be more than one primary process using a different CSI-IM, i.e. "one primary process" is just an example; as another example there could be two such primary processes using different CSI-IM than the remaining (at least two) CSI processes.

In a variation of the above embodiment, the method 30 comprises muting all transmissions in the at least two sectors at the resource used for the CSI-IM configuration.

In an embodiment, the configuring of CSI resources comprises configuring different none-zero power CSI-RS for different CSI processes.

In an embodiment, the method 30 comprises deriving, for a transmission rank equal to two or higher, a channel quality estimation for different hypothesis regarding transmission decisions of the at least two sectors 0, 1, 2, 3, by combining channel quality estimations from CSI reports received from the communication device 5, wherein one CSI report corresponds to one transmission layer.

Figure 9:
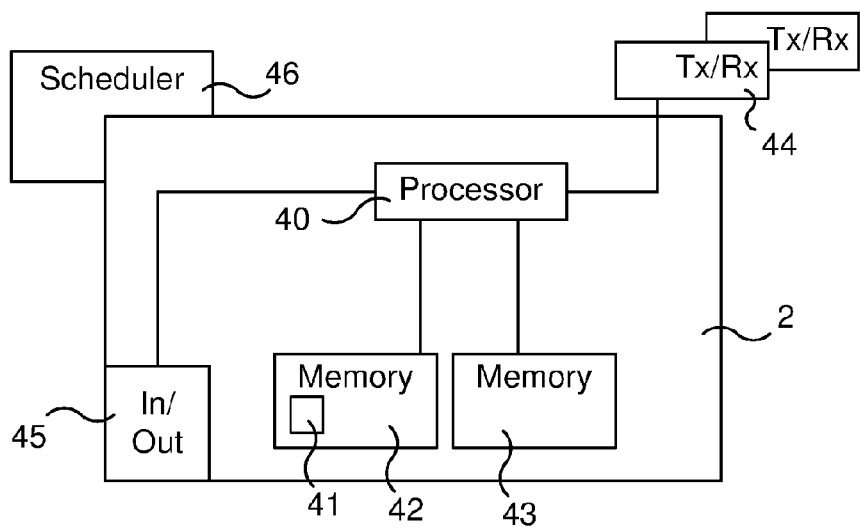
FIG. 9 illustrates schematically a network node and means for implementing methods of the present disclosure.

FIG. 9 illustrates schematically a network node and means for implementing methods of the present disclosure. The network node 2 may comprise or be able to control a number of antenna devices, in the figure indicated schematically by reference numeral 44. An antenna device may comprise means, such as radiators, receiving circuitry, transmitting circuitry etc. for wireless transmission/reception.

The network node 2 may further comprise or communicate with various other devices, such as a scheduler device 46.

The network node 2 comprises an interface device 45 towards other network node of the communication system 1. In the figure such interface 45 is indicated by an input/output (I/O) device. The network node 2 may thereby communicate with other network nodes of the communication system 1. The communication may entail receiving and transmitting data from and to the other network nodes. The interface device 45 is configured to convey such communication to a processor 40.

The network node 2 comprises a processor 40 comprising any combination of one or more of a central processing unit (CPU), multiprocessor, microcontroller, digital signal processor (DSP), application specific integrated circuit etc. capable of executing software instructions stored in a memory 42, which can thus be a computer program product 42. The processor 40 can be configured to execute any of the various embodiments of the method as has been described, e.g. as described in relation to FIG. 8.

In particular, a network node 2 of a communication system 1 for configuring a communication device 5 with channel state information, CSI, resources is provided. The network 2 comprises the processor 40 and memory 42, the memory 42 containing instructions executable by the processor 40, whereby the network node 2 is operative to:
configure CSI resources for at least two sectors 0, 1, 2, 3, the CSI resources comprising CSI reference signal, RS, resources and CSI interference measurements, IM, resources, such that the sectors 0, 1, 2, 3, are configured with same CSI IM resources, and such that each of the sectors 0, 1, 2, 3, is configured with CSI RS resources differing from the other sectors 0, 1, 2, 3, and
configure the communication device 5 to use a respective CSI resource configuration for each of at least two CSI processes, wherein each CSI resource configuration defines resources corresponding to resources of the configuring 31 of a respective sector 0, 1, 2, 3, whereby each CSI process specifies use of same CSI IM resources as the other CSI processes and CSI RS resources different from the other CSI processes.

In an embodiment, the network node 2 is configured to:
establish that a communication device 5 is configurable for multiple CSI processes, and configured to configure by:
transmitting a configuration message comprising the CSI resource configurations for each of the at least two CSI processes.

In a variation of the above embodiment, the configuration message comprises, for transmission ranks equal to two and higher, a rank inheritance indication configuring the communication device 5 to report same rank for all CSI processes.

In an embodiment, the network node 2 is configured to:
establish that a communication device 5 is configurable for a single CSI process, and configured to configure by:
transmitting a first configuration message comprising a first CSI resource configuration for a first CSI process and transmitting a respective reconfiguration message comprising a respective CSI resource configuration for each of the remaining CSI processes.

In an embodiment, the network node 2 is configured to configure the communication device 5 to use a primary CSI resource configuration comprising same CSI-RS resources as one of the at least two CSI processes and different CSI-IM resources as the at least two CSI processes.

In an embodiment, the network node 2 is configured to:
receive, from the communication device 5, a CSI report for each CSI process, and
derive, based on the CSI reports, a channel quality estimation for different hypothesis regarding transmission decisions of the at least one sector 0, 1, 2, 3, of the set of sectors, wherein the hypotheses comprises inter-sector interference hypotheses, and/or joint transmission hypotheses.

In an embodiment, the network node 2 is configured to repeat, upon change of neighboring sectors for the communication device 5, configuring of the communication device 5.

In an embodiment, each CSI process is defined by one CSI-RS configuration and one CSI-IM configuration, and wherein the network node 2 is configured to configure the CSI-IM configuration for all communication devices of the communication system 1, which are configurable for more than one CSI process, to be, across all the communication devices, the same for at least two CSI processes, or the same for at least all but one of the CSI processes for which each particular communication device is configurable.

For example, the network node 2 may be configured to configure the CSI-IM configuration for all communication devices of the communication system 1 to be the same.

In a variation of the above embodiment, the network node 2 is configured to mute all transmissions in the at least two sectors at the resource used for the CSI-IM configuration.

In an embodiment, the network node 2 is configured to configure CSI resources by configuring different none-zero power CSI-RS for different CSI processes.

In an embodiment, the network node 2 is configured to derive, for a transmission rank equal to two or higher, a channel quality estimation for different hypothesis regarding transmission decisions of the at least two sectors 0, 1, 2, 3, by combining channel quality estimations from CSI reports received from the communication device 5, wherein one CSI report corresponds to one transmission layer.

Still with reference to FIG. 9, the memory 42 can be any combination of read and write memory (RAM) and read only memory (ROM). The memory 42 also comprises persistent storage, which, for example, can be any single one or combination of magnetic memory, optical memory, solid state memory or even remotely mounted memory.

A data memory 43 may also be provided for reading and/or storing data during execution of software instructions in the processor 40. The data memory 43 can be any combination of read and write memory (RAM) and read only memory (ROM).

The disclosure also encompasses a computer program product 42 comprising a computer program 41 for implementing the methods as has described, and a computer readable means on which the computer program 41 is stored. The computer program product 42 may be any combination of read and write memory (RAM) or read only memory (ROM). The computer program product 42 may also comprise persistent storage, which for example can be any single one or combination of magnetic memory, optical memory or solid state memory.

The present disclosure thus comprises a computer program 31 for a network node 2 of a communication system 1 for configuring a communication device 5 with channel state information, CSI, resources. The computer program 41 comprises computer program code, which, when run on the network node 2 causes the network node 2 to:
configure CSI resources for at least two sectors 0, 1, 2, 3, the CSI resources comprising CSI reference signal, RS, resources and CSI interference measurements, IM, resources, such that the sectors 0, 1, 2, 3, are configured with same CSI IM resources, and such that each of the sectors 0, 1, 2, 3, is configured with CSI RS resources differing from the other sectors 0, 1, 2, 3, and
configure the communication device 5 to use a respective CSI resource configuration for each of at least two CSI processes, wherein each CSI resource configuration defines resources corresponding to resources of the configuring of a respective sector 0, 1, 2, 3, whereby each CSI process specifies use of same CSI IM resources as the other CSI processes and CSI RS resources different from the other CSI processes.

The present disclosure also provides a computer program product 42 comprising a computer program 41 as described above, and a computer readable means on which the computer program 31 is stored. The computer program product 42, or the memory, thus comprises instructions executable by the processor 40. Such instructions may be comprised in a computer program, or in one or more software modules or function modules.

Figure 10:
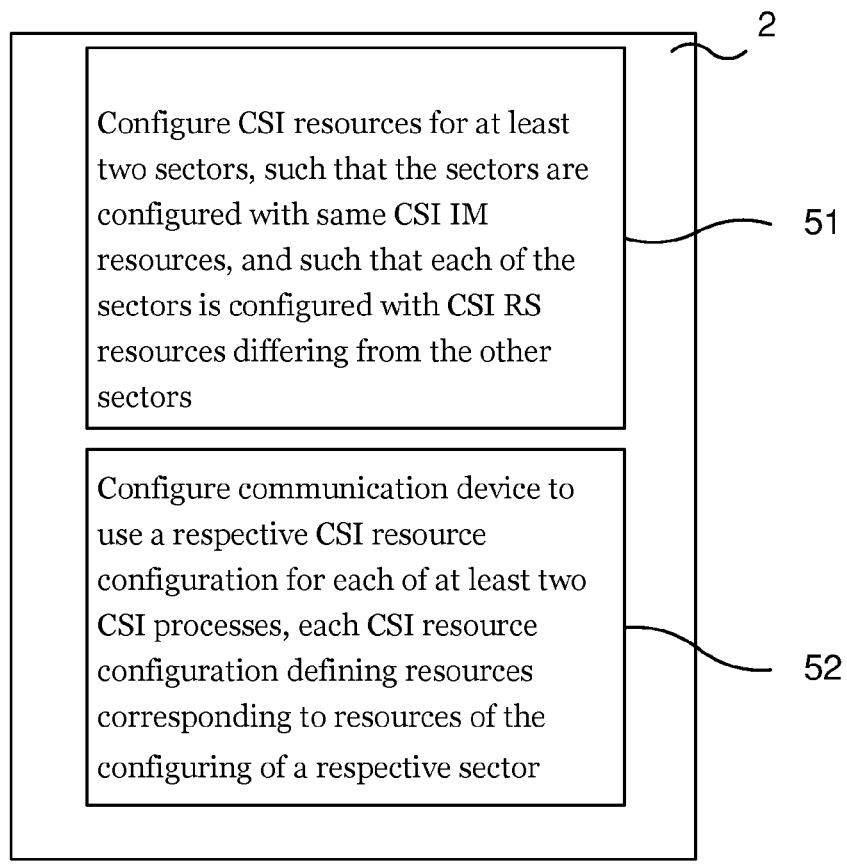
FIG. 10 illustrates a network node comprising functions modules/software modules for implementing methods of the present disclosure.

An example of an implementation using function modules/software modules is illustrated in FIG. 10, in particular illustrating network node 2 comprising means, e.g. function modules for implementing methods of the present disclosure. The network node 2 comprises means, for example a first function module 51, for configuring CSI resources for at least two sectors 0, 1, 2, 3, the CSI resources comprising CSI reference signal, RS, resources and CSI interference measurements, IM, resources, such that the sectors 0, 1, 2, 3, are configured with same CSI IM resources, and such that each of the sectors 0, 1, 2, 3, is configured with CSI RS resources differing from the other sectors 0, 1, 2, 3.

The network node 2 comprises means, for example a first function module 51 for configuring the communication device 5 to use a respective CSI resource configuration for each of at least two CSI processes, wherein each CSI resource configuration defines resources corresponding to resources of the configuring of a respective sector 0, 1, 2, 3, whereby each CSI process specifies use of same CSI IM resources as the other CSI processes and CSI RS resources different from the other CSI processes.

The function modules 51, 52 can be implemented using software instructions such as computer program executing in a processor and/or using hardware, such as application specific integrated circuits, field programmable gate arrays, discrete logical components etc.

Modifications of the disclosed embodiments and other embodiments will come to mind to one skilled in the art having the benefit of the disclosure presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed in a network node of a communication system for configuring a communication device with channel state information, CSI, resources, the method comprising:
   configuring CSI resources for at least two sectors, the CSI resources comprising CSI reference signal, RS, resources and CSI interference measurements, IM, resources, such that the sectors are configured with same CSI-IM resources, and such that each of the sectors is configured with CSI-RS resources differing from the other sectors, and
   configuring the communication device to use a respective CSI resource configuration for each of at least two CSI processes, wherein each CSI resource configuration defines resources corresponding to resources of the configuring of a respective sector, whereby each CSI process specifies use of same CSI-IM resources as the other CSI processes and CSI-RS resources different from the other CSI processes,
   wherein each CSI process is defined by one CSI-RS configuration and one CSI-IM configuration, and the method further comprises:
   muting all transmissions in the at least two sectors at the resource used for the CSI-IM configuration.

2. The method as claimed in claim 1, comprising:
   establishing that a communication device is configurable for multiple CSI processes, and wherein the configuring comprises:
   transmitting a configuration message comprising the CSI resource configurations for each of the at least two CSI processes.

3. The method as claimed in claim 2, wherein the configuration message comprises, for transmission ranks equal to two and higher, a rank inheritance indication configuring the communication device to report same rank for all CSI processes.

4. The method as claimed in claim 1, comprising:
   establishing that a communication device is configurable for a single CSI process, and wherein the configuring comprises:
   transmitting a first configuration message comprising a first CSI resource configuration for a first CSI process and transmitting a respective reconfiguration message comprising a respective CSI resource configuration for each of the remaining CSI processes.

5. The method as claimed in claim 1, comprising configuring the communication device to use a primary CSI resource configuration comprising same CSI-RS resources as one of the at least two CSI processes and different CSI-IM resources as the at least two CSI processes.

6. The method as claimed in claim 1, comprising:
   receiving, from the communication device, a CSI report for each CSI process, and
   deriving, based on the CSI reports, a channel quality estimation for different hypotheses regarding transmission decisions of the at least one sector of the set of sectors, wherein the hypotheses comprise inter-sector interference hypotheses, and/or joint transmission hypotheses.

7. The method as claimed in claim 1, comprising repeating, upon change of neighboring sectors for the communication device, configuring of the communication device.

8. The method as claimed in claim 1, wherein the method comprises configuring the CSI-IM configuration for all communication devices of the communication system which are configurable for more than one CSI process to be, across all the communication devices, the same for at least two CSI processes, or the same for at least all but one of the CSI processes for which each particular communication device is configurable.

9. The method as claimed in claim 1, wherein the configuring of CSI resources comprises configuring different none-zero power CSI-RS for different CSI processes.

10. The method as claimed in claim 1, comprising deriving, for a transmission rank equal to two or higher, a channel quality estimation for different hypotheses regarding transmission decisions of the at least two sectors, by combining channel quality estimations from CSI reports received from the communication device, wherein one CSI report corresponds to one transmission layer.

11. A network node of a communication system for configuring a communication device with channel state information, CSI, resources, the network node comprising a processor and memory, the memory containing instructions executable by the processor, whereby the network node is operative to:
   configure CSI resources for at least two sectors, the CSI resources comprising CSI reference signal, RS, resources and CSI interference measurements, IM, resources, such that the sectors are configured with same CSI-IM resources, and such that each of the sectors is configured with CSI-RS resources differing from the other sectors, and
   configure the communication device to use a respective CSI resource configuration for each of at least two CSI processes, wherein each CSI resource configuration defines resources corresponding to resources of the configuring of a respective sector, whereby each CSI process specifies use of same CSI-IM resources as the other CSI processes and CSI-RS resources different from the other CSI processes, wherein each CSI process is defined by one CSI-RS configuration and one CSI-IM configuration, and whereby the network node is further configured to mute all transmissions in the at least two sectors at the resource used for the CSI-IM configuration.

12. The network node as claimed in claim 11, configured to:

establish that a communication device is configurable for multiple CSI processes, and configured to configure by:

transmitting a configuration message comprising the CSI resource configurations for each of the at least two CSI processes.

13. The network node as claimed in claim 12, wherein the configuration message comprises, for transmission ranks equal to two and higher, a rank inheritance indication configuring the communication device to report same rank for all CSI processes.

14. The network node as claimed in claim 11, configured to:

establish that a communication device is configurable for a single CSI process, and configured to configure by:

transmitting a first configuration message comprising a first CSI resource configuration for a first CSI process and transmitting a respective reconfiguration message comprising a respective CSI resource configuration for each of the remaining CSI processes.

15. The network node as claimed in claim 11, configured to configure the communication device to use a primary CSI resource configuration comprising same CSI-RS resources as one of the at least two CSI processes and different CSI-IM resources as the at least two CSI processes.

16. The network node as claimed in claim 11, configured to:

receive, from the communication device, a CSI report for each CSI process, and derive, based on the CSI reports, a channel quality estimation for different hypotheses regarding transmission decisions of the at least one sector of the set of sectors, wherein the hypotheses comprise inter-sector interference hypotheses, and/or joint transmission hypotheses.

17. The network node as claimed in claim 11, configured to repeat, upon change of neighboring sectors for the communication device, configuring of the communication device.

18. The network node as claimed in claim 11, wherein the network node is configured to configure the CSI-IM configuration for all communication devices of the communication system, which are configurable for more than one CSI process, to be, across all the communication devices, the same for at least two CSI processes, or the same for at least all but one of the CSI processes for which each particular communication device is configurable.

19. The network node as claimed in claim 11, configured to configure CSI resources by configuring different none-zero power CSI-RS for different CSI processes.

20. The network node as claimed in claim 11, configured to derive, for a transmission rank equal to two or higher, a channel quality estimation for different hypotheses regarding transmission decisions of the at least two sectors, by combining channel quality estimations from CSI reports received from the communication device, wherein one CSI report corresponds to one transmission layer.

21. A computer program, stored on a non-transitory computer readable medium, for a network node of a communication system for configuring a communication device with channel state information, CSI, resources, the computer program comprising computer program code, which, when run on the network node causes the network node to:

configure CSI resources for at least two sectors, the CSI resources comprising CSI reference signal, RS, resources and CSI interference measurements, IM, resources, such that the sectors are configured with same CSI IM resources, and such that each of the sectors is configured with CSI RS resources differing from the other sectors, and configure the communication device to use a respective CSI resource configuration for each of at least two CSI processes, wherein each CSI resource configuration defines resources corresponding to resources of the configuring of a respective sector, whereby each CSI process specifies use of same CSI-IM resources as the other CSI processes and CSI-RS resources different from the other CSI processes, wherein each CSI process is defined by one CSI-RS configuration and one CSI-IM configuration, and whereby the network node is further configured to mute all transmissions in the at least two sectors at the resource used for the CSI-IM configuration.

* * * * *